June 7, 1955 R. L. TAYLOR 2,709,896
SAFETY DEVICE FOR VEHICLE HYDRAULIC BRAKE SYSTEMS
Filed Feb. 13, 1953 2 Sheets-Sheet 1
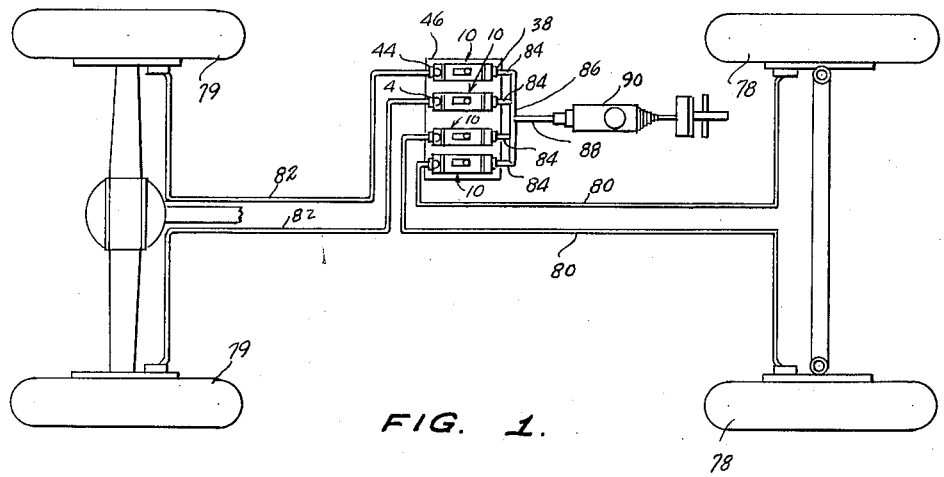
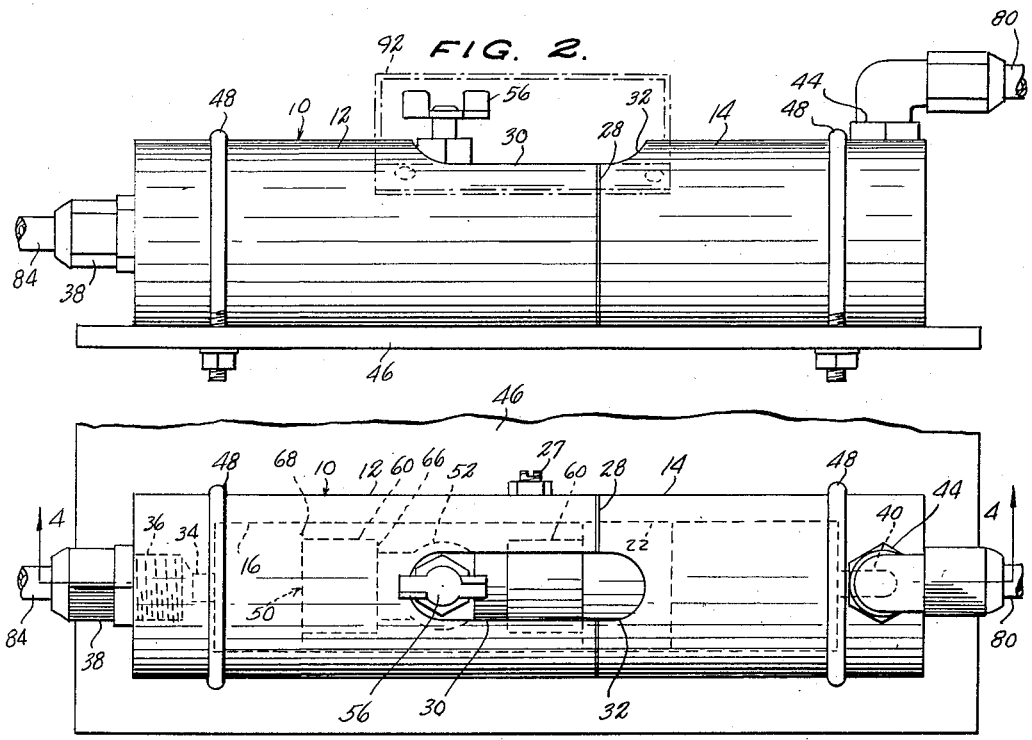
INVENTOR.
ROBERT L. TAYLOR,
BY
McMorrow, Berman & Davidson
ATTORNEYS June 7, 1955  R. L. TAYLOR  2,709,896
SAFETY DEVICE FOR VEHICLE HYDRAULIC BRAKE SYSTEMS
Filed Feb. 13, 1953  2 Sheets-Sheet 2

INVENTOR.
ROBERT L. TAYLOR,
BY
McMorrow, Berman & Davidson
ATTORNEYS.

United States Patent Office 2,709,896
Patented June 7, 1955

2,709,896

SAFETY DEVICE FOR VEHICLE HYDRAULIC BRAKE SYSTEMS

Robert L. Taylor, Rupert, W. Va.

Application February 13, 1953, Serial No. 336,687

3 Claims. (Cl. 60—54.5)

This invention relates to a safety device for the hydraulic brake system of a vehicle, and more particularly, has reference to a safety device of the form of an auxiliary cylinder having a reciprocating piston therein, said cylinder being adapted to be connected in the fluid line extending to each wheel of the vehicle from the master cylinder of the brake system.

Conventional hydraulic brake systems for vehicles are so designed as to render the brakes of all the vehicle wheels inoperative, should the fluid lines be ruptured at any location. This is a dangerous characteristic of the hydraulic brake systems now in use, and it is obviously desirable that means be provided that will be effective to retain braking power to the maximum extent, should said rupture of the fluid line extending to any wheel occur.

The broad object of the present invention is to provide a hydraulic brake system for vehicles which will achieve the desirable result discussed above.

More specifically, it is an object of the present invention to provide an auxiliary cylinder, in the nature of a safety device, for association with each of the four wheels of the vehicle, with each auxiliary cylinder being connected in communication at one end with the fluid line extending to its associated wheel, and being connected in communication, independently of any other auxiliary cylinder or cylinders, with the master cylinder of the vehicle. The auxiliary cylinder has a reciprocating piston therein that defines normally non-communicating chambers at opposite ends of the cylinder, and thus, when braking pressure is applied, said piston will be caused to shift in one direction, to force fluid under pressure to the associated wheel. When said braking pressure is relieved, the piston will shift in an opposite direction, back to a normal position.

Obviously, since the piston prevents communication between opposite ends of the auxiliary cylinder in which it is disposed, and since there is an auxiliary cylinder in each wheel line, a rupture in said wheel line will not result in loss of fluid pressure in any other wheel line of the vehicle, and thus braking power will be retained in the brakes of the unaffected wheels.

Another object of importance is to provide, in an auxiliary hydraulic cylinder of the character referred to, an end to end bore in the reciprocable piston, which end to end bore, when open throughout its length, will permit fluid flow between the pressure chambers at opposite ends of the cylinder, thus to provide a continuous flow passage extending from the master cylinder to the associated wheel brake, whereby to permit filling of the braking system with hydraulic fluid, or bleeding of said system, as necessary. Mounted upon the piston to control flow through said bore of the piston is a manually operable valve, which is opened when the brake system of the vehicle is being conditioned in the manner stated, said valve being turned to a closed position under all other circumstances, to normally close off communication between the pressure chambers at opposite ends of the auxiliary cylinder.

Other objects will appear from the following description, the claims appended thereto, and from the annexed drawing, in which like reference characters designate like parts throughout the several views, and wherein:

Figure 1 is a diagrammatic representation of a hydraulic brake system formed in accordance with the invention;

Figure 2 is a side elevational view of one of the auxiliary cylinders;

Figure 3 is a top plan view of said cylinder, a mounting plate being shown fragmentarily;

Figure 4:
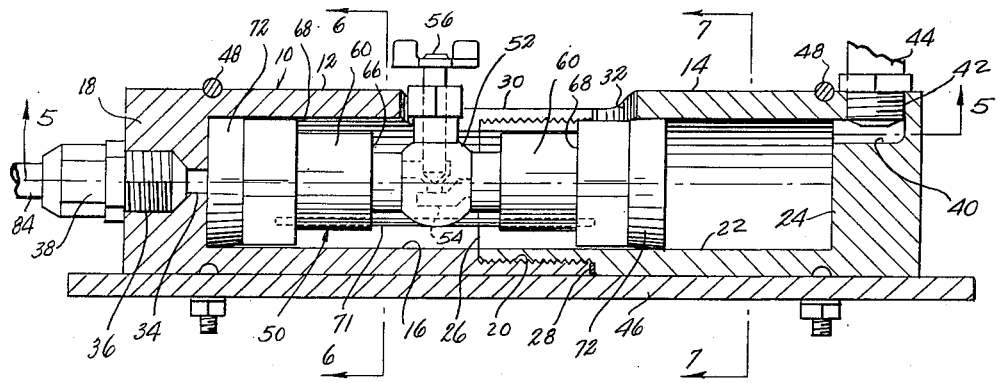
Figure 4 is a longitudinal sectional view on line 4—4 of Figure 3.

The reference numeral 10 has been applied generally to the auxiliary hydraulic cylinder, and as will be noted from Figure 1, four identical cylinders 10 are incorporated in the hydraulic brake system of the vehicle, one for each of the vehicle wheels.

The cylinder 10 includes a relatively elongated, hollow, cylindrical casing of constant diameter from end to end thereof, said casing being formed of coaxially aligned, connected casing sections 12, 14.

The casing section 12 has a cylindrical side wall, and is formed with a cavity 16 opening at one end of the section, and closed, at the other end of the section, by an end wall 18.

The cavity 16, at the open end of the section, is enlarged in diameter as at 20, the enlarged portion of said cavity being threaded.

The casing section 14 is also formed with a cavity 22 opening at one end of said section 14, and closed at the other or outer end of section 14 by an end wall 24.

The section 14, at its open end, is exteriorly reduced in diameter as at 26, and is externally threaded for engagement with the threads of the casing section 12. Thus, the sections are fixedly connected in end to end relation, to form a casing closed at its opposite ends, and having a continuously extending interior cavity. The overall length of the interior cavity can be adjusted by utilizing a shim or shims 28, between the abutting ends of the sections 12, 14.

Formed in the inner end of the casing section 12 is a longitudinal slot 30, said slot 30 communicating with a slot 32 formed in the casing section 14, when said sections are joined together. Thus, the casing formed from the sections 12, 14 is provided with a longitudinal slot medially between the opposite ends thereof, said slot terminating well short of the end walls 18, 24, as best shown in Figures 2 and 4.

In the end wall 18, a center bore 34 is formed, said center bore being counterbored as at 36 and threaded to receive a connecting fitting 38. The bore 34 extends into communication with the interior cavity of the casing.

The end wall 24, at the other end of the casing, has, at the marginal portion thereof, a bore 40 communicating with the interior of the casing, said bore 40 opening into a radially disposed, threaded opening 42, in which is engaged a connecting fitting 44.

Four casings, all of identical formation, are mounted upon a single mounting plate 46 (Figure 1), through the provision of U-clamps 48. The mounting plate, as will be understood, is fixedly secured to any selected structural member of the vehicle.

Figure 5:
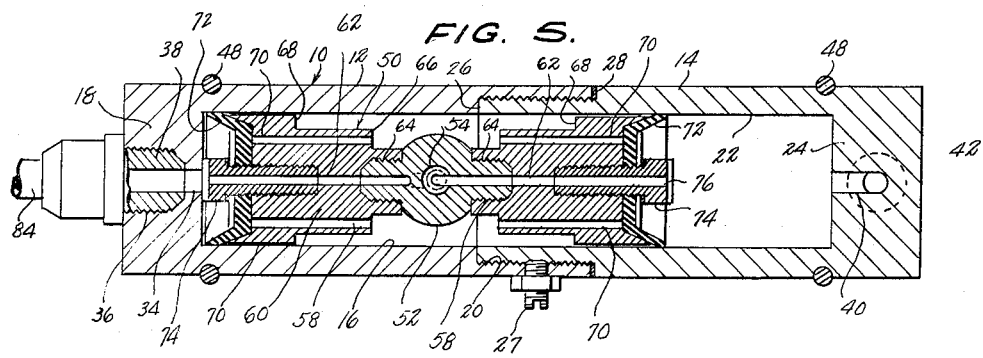
Figure 5 is a longitudinal sectional line on line 5—5 of Figure 4.

Reciprocating in each of the casings is a piston designated generally by the reference numeral 50, the construction of said piston being best shown in Figures 4 and 5. Medially between the opposite ends of the piston, there is a generally globular or rounded valve body 52 the outer diameter of which is substantially reduced relative to the diameter of the piston-receiving cavity of the casing. Valve body 52 has, therein, an approximately S-shaped passage 54 (see Figure 4), the S-shaped formation of said passage defining an offset therein medially between the opposite ends of the passage, which offset is tapered to provide a seat for the correspondingly tapered inner end of a valve stem. The valve stem is part of a conventionally designed valve having a handle 56 projecting outwardly through the longitudinal slot of the casing, it being understood that on rotation of said handle in one direction, the valve stem will be shifted against its associated seat, to close the passage 54. On rotation of the handle in the opposite direction the stem will be lifted off its seat, to permit flow through said passage 54.

The valve body is integrally formed with oppositely projecting, externally threaded end portions 58 of reduced diameter relative to the main diameter of the valve body, said end portions being aligned coaxially longitudinally and centrally of the casing.

The reference numeral 60 has been applied to identical though opposite piston members, said members being disposed at opposite sides of the valve body and being each formed, at its inner end, with a recess 64 threaded to receive the adjacent end portion 58.

Each piston member has an axial bore 62 extending from end to end thereof, said bore 62 opening at one end into the threaded recess 64. Accordingly, when the valve body is connected to the inner ends of the respective piston members 60, the bore 62 of each piston member will be connected in communication with the S-shaped passage 54 of the valve body, which passage has its ends opening through the end portions 58 of said valve body.

Figure 6:
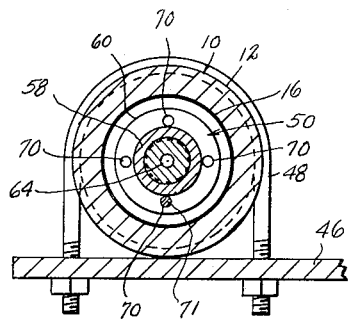
Figure 6 is a transverse sectional view on line 6—6 of Figure 4.

Each piston member is of longitudinally stepped formation, thus to provide an inner shoulder 66 adjacent the inner end of each piston member, and an outer shoulder 68 adjacent the outer end of said piston member. A plurality of lock pin bores 70 is formed in each piston member, said bores 70 being disposed in a circumferential series as best shown in Figure 6, and being extended in parallelism with the axial bore 62 of the piston member. Each lock pin bore 70 opens at one end upon the outer end of the piston member, and at its other end upon the shoulder 66 of said piston member.

After the piston members have been assembled with the valve body in the manner shown in Figure 5, and before piston cups 72 are applied to the outer ends thereof, a lock pin 71 is extended through selected, aligned lock pin bores of the respective piston members. It may be noted that in the illustrated example, only one lock pin is used, but obviously, more can be used if desired.

The piston cups 72, as will be noted from Figure 5, close the outer ends of the unused lock pin bores 70, each piston cup having a center opening through which is extended a screw 74, the screw 74 being threaded in a complementarily threaded counterbore formed in the outer end of the axial bore 62 of the piston member.

The screw 74 is formed with an end to end axial bore communicating with the bore 62, and thus, if the valve 56 is opened, the reciprocating piston mounted within the casing is provided with an end to end bore that will communicate with the pressure chambers defined at opposite ends of the piston within the casing. If, however, the valve is shifted to closed position, the pressure chambers at opposite ends of the casing will be out of communication with each other.

The bores of the screws 74 have been designated by the reference numerals 76.

Referring now to Figure 1, there is here shown diagrammatically a hydraulic brake system in which use is made of the auxiliary cylinders described in detail above. In the illustrated example, the vehicle has front wheels 78 and rear wheels 79. Front wheel fluid lines 80 extend to the brakes of the respective front wheels 78, while rear wheel fluid lines extend from the brakes of the rear wheels 79, the rear wheel fluid lines being designated by the reference numeral 82.

The ends of the lines 80, 82 remote from their associated wheels are connected to the several fittings 44. Then, branch lines 84 are connected to the fittings 38 at the other ends of the casings, said branch lines 84 extending into communication with a line 86 extending to the line 88 of the master cylinder 90.

In use of the invention, the valves 56 will all be opened when the brake system is being filled with fluid or is being bled. Then, the several valves 56 are closed, this being the normal position of the valves.

Subsequently, when braking pressure is applied, fluid will be forced under pressure through the openings 34 into the several casings, thus shifting the several pistons to the right in Figures 4 and 5. As a result, fluid will be forced out of the casings, into the wheel lines 80, 82, thus to cause braking pressure to be applied uniformly to the several wheels of the vehicle. Subsequently, when braking pressure is relieved, the fluid, returning from the wheels, will return the pistons to their normal position.

Should a rupture occur in any one of the lines 80 or 82, there will still be braking power at the unaffected wheels of the vehicle, since the safety device associated with the particular, ruptured wheel line will prevent loss of any fluid, except, of course, the fluid within the ruptured wheel line itself. In other words, there will still be a sealed line along which fluid pressure is directed, from the master cylinder to each of the unaffected wheels of the vehicle.

Figure 7:
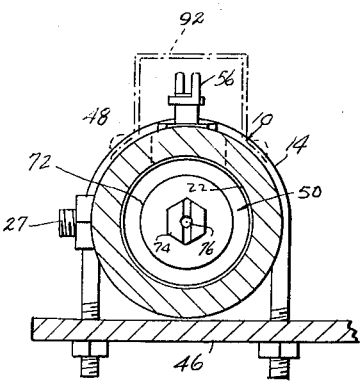
Figure 7 is a transverse sectional view on line 7—7 of Figure 4.

As shown in Figures 2 and 7 in dotted line, a cap 92 can be removably connected by screws to the casing, to cover the longitudinal slot. This would be of transparent material or would have a view window therein, to facilitate checking of the piston position.

It is believed apparent that the invention is not necessarily limited to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a fluid operated system having a single source of fluid under variable pressure and a plurality of branch conduits extending from said source, a safety device for each branch conduit to prevent leakage of fluid occurring in said conduit from affecting the remaining conduits, comprising: a cylinder adapted for connection in an associated branch conduit; and a free-floating, double-ended piston working in said cylinder, said piston including piston members at its ends formed with longitudinal bores, a valve body connected to and disposed between said piston members and having a bore communicating at its ends with the piston member bores, said valve body bore having a midlength part disposed transversely of the piston and cylinder and formed with a valve seat, a valve shiftable transversely of the piston within said midlength part into and out of engagement with said seat, the cylinder having a longitudinal slot through which the valve is extended to prevent rotation of the valve body relative to the cylinder, said piston members being threadedly connected to the valve body, and means extending through the piston members and valve body and interengaging the same against rotation relative to one another.

2. In a fluid operated system having a single source of fluid under variable pressure and a plurality of branch conduits extending from said source, a safety device for each branch conduit to prevent leakage of fluid occurring in said conduit from affecting the remaining conduits, comprising: a cylinder adapted for connection in an associated branch conduit; and a free-floating, double-ended piston working in said cylinder, said piston including piston members at its ends formed with longitudinal bores, a valve body connected to and disposed between said piston members and having a bore communicating at its ends with the piston member bores, said valve body bore having a midlength part disposed transversely of the piston and cylinder and formed with a valve seat, a valve shiftable transversely of the piston within said midlength part into and out of engagement with said seat, the cylinder having a longitudinal slot through which the valve is extended to prevent rotation of the valve body relative to the cylinder, said piston members being threadedly connected to the valve body, and means extending through the piston members and valve body and interengaging the same against rotation relative to one another, said means including a pin extending longitudinally of the piston, the piston members having longitudinally extending sockets receiving the opposite ends of said pin.

3. In a fluid operated system having a single source of fluid under variable pressure and a plurality of branch conduits extending from said source, a safety device for each branch conduit to prevent leakage of fluid occurring in said conduit from affecting the remaining conduits, comprising: a cylinder adapted for connection in an associated branch conduit; and a free-floating, double-ended piston working in said cylinder, said piston including piston members at its ends formed with longitudinal bores, a valve body connected to and disposed between said piston members and having a bore communicating at its ends with the piston member bores, said valve body bore having a midlength part disposed transversely of the piston and cylinder and formed with a valve seat, a valve shiftable transversely of the piston within said midlength part into and out of engagement with said seat, the cylinder having a longitudinal slot through which the valve is extended to prevent rotation of the valve body relative to the cylinder, said piston members being threadedly connected to the valve body, and means extending through the piston members and valve body and interengaging the same against rotation relative to one another, said means including a pin extending longitudinally of the piston, the piston members having longitudinally extending sockets receiving the opposite ends of said pin, said pistons including piston cups secured to the respective piston members in wiping contact with the cylinder wall, the piston cups closing said sockets at one end.

References Cited in the file of this patent

UNITED STATES PATENTS

| | | |
|---|---|---|
| 1,922,252 | Martini | Aug. 15, 1933 |
| 2,529,306 | Morris | Nov. 7, 1950 |
| 2,566,147 | Severini | Aug. 28, 1951 |
| 2,585,511 | Sparks | Feb. 12, 1952 |